United States Patent
Liu et al.

(10) Patent No.: US 11,438,547 B2
(45) Date of Patent: Sep. 6, 2022

(54) VIDEO FRAME TRANSMISSION METHOD, APPARATUS, ELECTRONIC DEVICE AND READABLE STORAGE MEDIUM

(71) Applicant: APOLLO INTELLIGENT CONNECTIVITY (BEIJING) TECHNOLOGY CO., LTD., Beijing (CN)

(72) Inventors: Rong Liu, Beijing (CN); Xinqiang Cheng, Beijing (CN); Zhaolong Chen, Beijing (CN)

(73) Assignee: APOLLO INTELLIGENT CONNECTIVITY (BEIJING) TECHNOLOGY CO., LTD.

( * ) Notice: Subject to any disclaimer, the term of this patent is extended or adjusted under 35 U.S.C. 154(b) by 0 days.

(21) Appl. No.: 17/123,859

(22) Filed: Dec. 16, 2020

(65) Prior Publication Data

US 2021/0195138 A1   Jun. 24, 2021

(30) Foreign Application Priority Data

May 13, 2020   (CN) .......................... 202010400881.1

(51) Int. Cl.
*H04N 7/01* (2006.01)
*H04N 19/146* (2014.01)
(Continued)

(52) U.S. Cl.
CPC ........... *H04N 7/013* (2013.01); *H04N 19/146* (2014.11); *H04N 19/172* (2014.11); *H04N 21/23418* (2013.01)

(58) Field of Classification Search
None
See application file for complete search history.

(56) References Cited

U.S. PATENT DOCUMENTS

2007/0091815 A1    4/2007  Tinnakornsrisuphap et al.
2017/0353518 A1*  12/2017  McLeod ............. H04L 65/4084

FOREIGN PATENT DOCUMENTS

CN    101516017 A    8/2009
CN    102413307 A    4/2012
(Continued)

OTHER PUBLICATIONS

First Office Action in CN Patent Application No. 202010400881.1 dated Sep. 9, 2021.
(Continued)

*Primary Examiner* — Samira Monshi
(74) *Attorney, Agent, or Firm* — Dilworth IP, LLC

(57) ABSTRACT

The present application provides a video frame transmission method, apparatus, electronic device, and readable storage medium, and relates to the field of Internet of Vehicles, comprising: transmitting a first video frame of a target video to a target device at a reference frame rate; acquiring time delay of the first video frame; determining, according to the time delay, target frame rate of a second video frame to be transmitted in the target video; transmitting the second video frame to the target device at the target frame rate. By dynamically adjusting the transmission frame rate of the video frame in the method, the time delay of the video frame from creation to display on the target device is reduced, thereby ensuring the presentation effect of the video on the target device.

16 Claims, 5 Drawing Sheets

(51) Int. Cl.
*H04N 19/172* (2014.01)
*H04N 21/234* (2011.01)

(56) References Cited

FOREIGN PATENT DOCUMENTS

| | | |
|---|---|---|
| CN | 105430532 A | 3/2016 |
| CN | 106375841 A | 2/2017 |
| CN | 106534055 A | 3/2017 |
| CN | 110673813 A | 1/2020 |
| EP | 2530969 A1 | 12/2012 |
| WO | 2015017541 A1 | 2/2015 |

OTHER PUBLICATIONS

European Search Report in EP Patent Application No. 20215382.1 dated Mar. 22, 2021.
Second Office Action in related CN Patent Application No. 202010400881.1, dated Jan. 20, 2022, 14 pages.

\* cited by examiner

_VIDEO FRAME TRANSMISSION METHOD, APPARATUS, ELECTRONIC DEVICE AND READABLE STORAGE MEDIUM_

CROSS-REFERENCE TO RELATED APPLICATION

This application claims priority to Chinese Patent Application No. 202010400881.1, filed on May 13, 2020, which is hereby incorporated by reference in its entirety.

TECHNICAL FIELD

This disclosure relates to computer technology, and in particular, to a video frame transmission method, an apparatus, an electronic device and a readable storage medium.

BACKGROUND

Smart rearview mirrors are electronic devices equipped with independent operating systems, in which other software can be installed by the users separately. Like traditional rearview mirrors, the smart rearview mirrors can also be installed inside the vehicle near the center of the windshield. The users can use the smart rearview mirrors for logging driving records, speeding reminders, rearview camera display, and navigation. To respond to the user's operation, the smart rearview mirror can present the contents of the response on the interface of the smart rearview mirror, or the smart rearview mirror can also cast the content required to be presented onto the in-car console end of the vehicle. Exemplarily, the user wakes up the smart rearview mirror with a voice wake-up instruction, then the smart rearview mirror recognizes the user's instruction and, rather than displaying the awakened screen on the smart rearview mirror, the smart rearview mirror casts the screen required to be presented to the car console, such that the picture is displayed on the screen of the in-car console. When the casting is required, the smart rearview mirror compiles the content required to be presented into a video, encodes the video into a video stream that is transmitted to the in-car console.

In the prior art, the smart rearview mirror uses a fixed frame rate to transmit the video streams. Specifically, the smart rearview mirror uses a fixed frame rate to transmit the video stream when casting onto various in-car consoles.

However, the method in the prior art can lead to excessive transmission delay of the video streams, which affects the presentation of video on the in-car console.

SUMMARY

The video frame transmission method, apparatus, electronic device and readable storage medium provided by the embodiments of the present disclosure are used for solving the problem that the video presentation is affected by the excessive video stream transmission delay in the prior art.

In a first aspect, an embodiment of the present disclosure provides a video frame transmission method, including:

transmitting a first video frame of a target video to a target device at a reference frame rate;

acquiring time delay of the first video frame;

determining, according to the time delay, a target frame rate of a second video frame to be transmitted in the target video; and transmitting, at the target frame rate, the second video frame to the target device.

In a second aspect, an embodiment of the present invention provides a video frame transmission apparatus, including:

a processing module, configured to transmit a first video frame of a target video to a target device at a reference frame rate; acquire time delay of the first video frame; determine a target frame rate of a second video frame to be transmitted in the target video according to the time delay;

a transmitting module, configured to transmit the second video frame to the target device at the target frame rate.

In a third aspect, an embodiment of the present disclosure provides an electronic device, including:

at least one processor; and a memory in communication with the at least one processor, where:

the memory stores thereon instructions executable by the at least one processor, and the instructions are executed by the at least one processor to enable the at least one processor to execute the method according to the first aspect.

In a fourth aspect, an embodiment of the present disclosure provides a non-transitory computer-readable storage medium storing thereon computer instructions that are used to cause a computer to execute the method according to the first aspect.

According to the technology of the present disclosure, after the first video frame leading the target video has been transmitted, the target frame rate for transmitting the latter second video frame is re-determined according to the time delay of the first video frame, and the second video frame is transmitted to the target device according to the target frame rate, so that the transmission frame rate of the second video frame matches the actual processing capacity of the target device. Therefore, by dynamically adjusting the transmission frame rate of the video frame, the time delay of the video frame from creation to display on the target device is reduced, thereby ensuring the presentation of the video on the target device.

It should be understood that what is described herein is not intended to identify key or important features of the embodiments of the present disclosure, nor is it intended to limit the scope of the present disclosure. Other features of the present disclosure will become apparent from the following description.

BRIEF DESCRIPTION OF THE DRAWINGS

The accompanying drawings are used for better understanding of the solution, and do not constitute a limitation to the present disclosure. In the drawings.

DESCRIPTION OF EMBODIMENTS

The exemplary embodiments of the present disclosure are illustrated below in conjunction with the accompanying drawings, various details of the embodiments of the present disclosure are contained for ease of understanding, and the embodiments should be considered as merely exemplary. Therefore, those of ordinary skill in the art should recognize that various changes and modifications to the embodiments described herein can be made without departing from the scope and spirit of the present disclosure. Also, for the sake of clarity and conciseness, descriptions of well-known functions and structures are omitted in the following description.

In the prior art, the smart rearview mirror uses a fixed frame rate to transmit video streams when casting to various types of in-car consoles. However, the performance of different types of in-car console varies. For in-car consoles with better performance, when the smart rearview mirror transmits the video stream at a fixed frame rate, the vehicle can display various videos in the video stream in time. For in-car consoles with poor performance, it takes a long time to decode each video frame in the video stream. When the smart rearview mirror transmits the video stream at a fixed frame rate, the in-car console may not be able to complete decoding and displaying of the video frames in time, which causes excessive casting delay, diminishing the presentation effect of the video on the in-car console. For example, after the user gives an instruction to the smart rearview mirror, there is a long interval between the display of the interface for responding to the instruction on the screen of the in-car console and the user giving the instruction, and/or video display is not smooth enough.

Taking into account the problem that in the prior art that the smart rearview mirror uses a fixed frame rate to transmit video frames may lead to excessive casting delay, thus affecting the presentation effect of video on the in-car console, the embodiment of the present disclosure dynamically adjusts the frame rate for transmitting video frames based on the transmission delay from video frames to the in-car console, so that the transmission frame rate matches the actual processing capacity of the in-car console, thereby avoiding excessive casting delay and ensuring the presentation effect of video on the in-car console.

Figure 1:
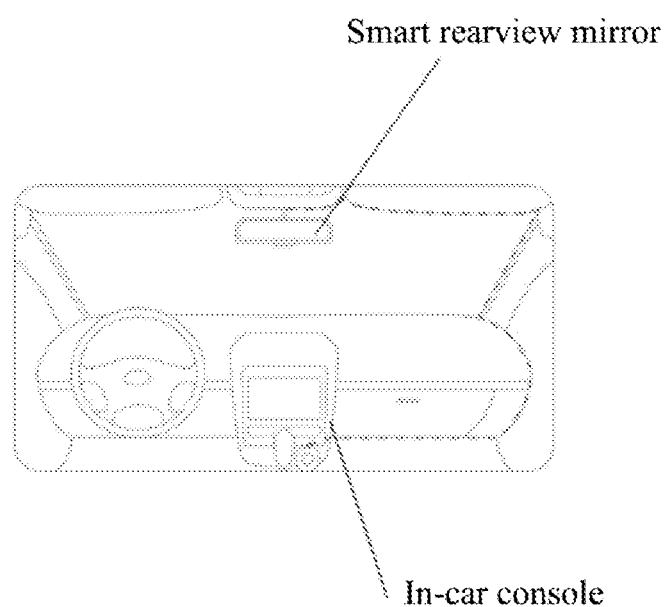
FIG. 1 is an exemplary system architecture diagram of a video frame transmission method provided by an embodiment of the present disclosure.

FIG. 1 is an exemplary system architecture diagram of a video frame transmission method provided by an embodiment of the present disclosure. As shown in FIG. 1, the method relates to a smart rearview mirror and an in-car console. The smart rearview mirror and the in-car console are both installed in the vehicle, and the smart rearview mirror can be installed in the vehicle near the center of the windshield. The in-car console can be installed in the center console of the vehicle, and the screen of the in-car console is set on the surface of the center console to display various piece of information for the user. The smart rearview mirror can be connected with the in-car console through wires, such as Universal Serial Bus (USB), or through wireless connection, such as Bluetooth or Wi-Fi. In some scenarios, for example, the user not only wants to use the smart rearview mirror for driving record, but also for viewing the road conditions behind the vehicle through a display method in a mirror form of the smart rearview mirror. The smart rearview mirror can record the content required to be displayed on its screen to form a video, and transmit the video to the in-car console according to the method of the embodiment of the present disclosure, and the in-car console will display the video on its screen, that is, the pictures required to be displayed is streamed into the in-car console.

It is worth noting that the above FIG. 1 is only an exemplary system architecture and an exemplary application scenario of an embodiment of the present disclosure. In addition, the method of the embodiment of the present disclosure can also be applied into other system architectures and application scenarios. For example, it may be applied into a scenario where a video in the mobile phone is required to be transmitted to the in-car console and then displayed. For ease of description, the following embodiments of the present disclosure take the scenario of casting from a smart rearview mirror to an in-car console as an example for description.

Figure 2:
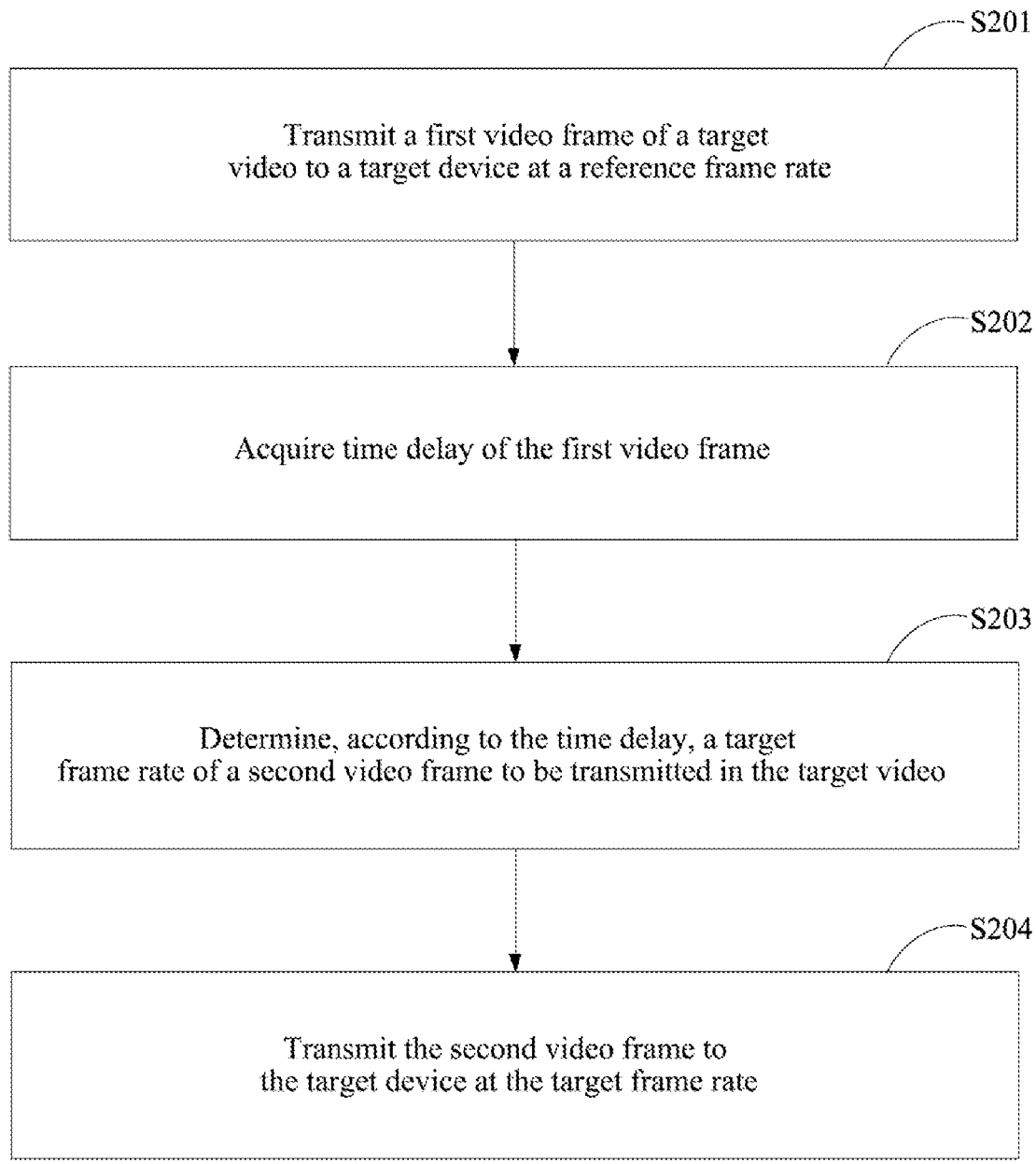
FIG. 2 is a schematic flowchart of a video frame transmission method provided by an embodiment of the present disclosure.

FIG. 2 is a schematic flowchart of a video frame transmission method provided by an embodiment of the present disclosure. The execution body of the method is an electronic device required to transmit a video stream to other devices, such as the aforementioned smart rearview mirror. As shown in FIG. 2, the method includes:

S201, transmit a first video frame of a target video to a target device at a reference frame rate.

Optionally, the above target video may be a video that the smart rearview mirror needs to transmit to the target device for display. Exemplarily, the target video may be a video composed of multiple display interfaces generated by a smart rearview mirror, or a video composed of navigation pictures, etc.

The above first video frame may be the first video frame in the target video, or a certain video frame in the front of the video frame sequence of the target video.

The above reference frame rate may be the initial frame rate when the smart rearview mirror starts transmitting the target video, or if the first video frame is a certain video frame that is sequentially following the target video frame, the above reference frame rate may also be a frame rate acquired from a certain video frame transmitted before the first video frame.

The above target device may be an electronic device that needs to display a target video, for example, the target device may be the aforementioned in-car console.

S202, acquire time delay of the first video frame.

The above time delay of the first video frame may refer to the elapsed time from the moment when the smart rearview mirror creates the first video frame to the moment when the target device finishes processing the first video frame and displaying it. The greater the time delay, the more mismatching between the speed for processing the video frames by the target device and the frame rate for transmitting the video frames by the smart rearview mirror. Specifically, the greater the time delay, the faster the frame rate for transmitting video frames by smart rearview mirror, and the number of video frames transmitted to the target device in a short time may exceed the processing capacity of the target device, thereby causing the target device to fail to complete the video decoding processing and display in time.

S203, determine, according to the time delay, target frame rate of a second video frame to be transmitted in the target video.

Optionally, the above second video frame is a video frame that is sequentially following the first video frame, either adjacent to, or not adjacent to the first video frame.

Time delay of the first video frame can reflect whether the frame rate for transmitting video frames by the smart rearview mirror matches the processing capability of the target device. Therefore, based on the time delay of the first video frame, the frame rate for transmitting the latter second video frame can be re-determined, so that the target device can process and display the second video frame in time after the second video frame is transmitted.

S204, transmit the second video frame to the target device at the target frame rate.

After receiving the second video frame, the target device decodes the second video frame and displays the second video frame on the screen of the target device.

In the present embodiment, after transmitting the first video frame located in the front in the target video, the target frame rate of the latter second video frame is re-determined according to the time delay of the first video frame, and the second video frame is transmitted to the target device according to the target frame rate, so that the transmission frame rate of the second video frame matches the actual processing capacity of the target device. Therefore, by dynamically adjusting the transmission frame rate of the video frame, the time delay of the video frame from creation to display on the target device is reduced, thereby ensuring the presentation effect of the video on the target device.

In the case of casting onto the in-car console by a smart rearview mirror, the method of the above embodiment can match the frame rate for transmitting the video stream by the smart rearview mirror with the actual processing capacity of the in-car console, thereby avoiding excessive casting delay and ensuring the presentation effect of the video on the in-car console.

The following describes the process of generating, transmitting and displaying video streams in the scenario where the smart rearview mirror casts onto the in-car console.

Optionally, the smart rearview mirror can record the video of the information to be displayed on the screen according to the instruction to stream onto the in-car console and acquire the target video. Furthermore, by using the method according to the embodiment of the present disclosure, the target video is streamed onto the in-car console and displayed on the screen thereof by the in-car console.

Optionally, the instruction to stream onto the in-car console may be entered by the user, or it may be automatically recognized by the smart rearview mirror.

In an example, when the smart rearview mirror is connected with the in-car console through wires or in a wireless mode, icons, buttons, links and other marks related to casting can be displayed on the screen of the in-car console. The user can click on the mark. After recognizing the user's operation, the in-car console determines that it has received the instruction that the user wants to stream, and transmits the instruction to the smart rearview mirror. After receiving the instruction, if there is something to be displayed on the screen later, the subsequent content that needs to be displayed on the screen is displayed in the background (in a way that is invisible to the user) and recorded as a video, and the recorded video is the target video.

Figure 3:
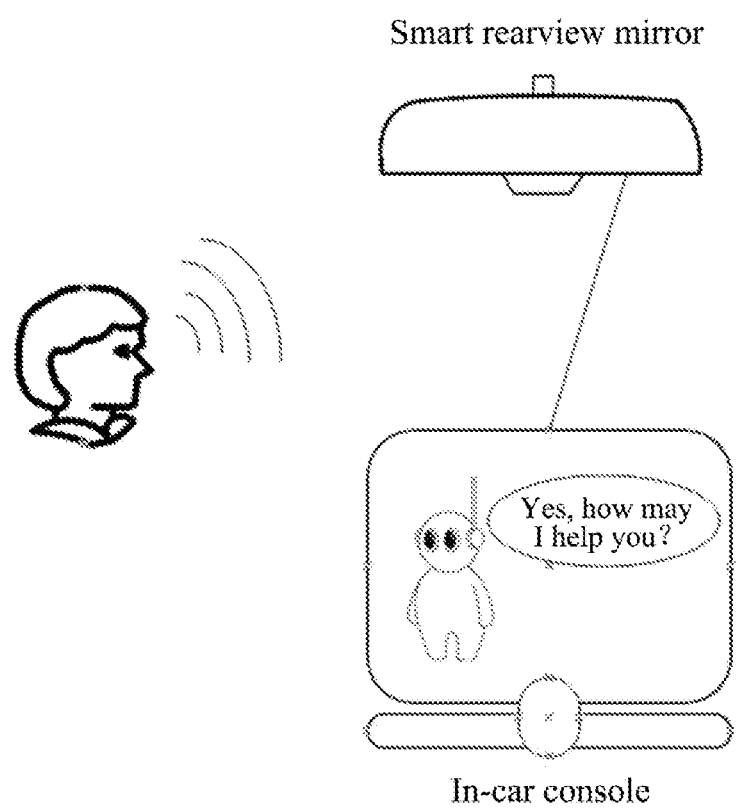
FIG. 3 is an example diagram of an interface of a scenario where the smart rearview mirror is streamed onto the in-car console.

FIG. 3 is an example diagram of an interface of a scenario where the smart rearview mirror is streamed onto the in-car console. As shown in FIG. 3, the smart rearview mirror has received the casting instruction in any of the aforementioned ways, and then the user transmits voice instructions to wake up the smart rearview mirror. For example, the user transmits out a wake-up voice of "Little A Little A", and after the smart rearview mirror recognizes the voice, it confirms that the voice assistant picture needs to be displayed, then records the picture to be displayed as a video in the background, and transmits a video frame to the in-car console for display on a screen thereof.

The following describes the process of dynamically determining the latter second video frame according to the time delay of the first video frame in step S203.

As an optional way, if the time delay of the first video frame is greater than or equal to the preset threshold, the reference frame rate is reduced based on the reference frame rate in transmitting the first video frame to obtain the above target frame rate.

Exemplarily, the reference frame rate can be reduced by 3 frames per second based on the reference frame rate to acquire the target frame rate.

When the time delay of the first video frame is greater than or equal to the preset threshold, it indicates that the transmission frame rate of the smart rearview mirror is too fast to match with the processing capability of the target device. Therefore, the reference frame rate is reduced and the reduced value is taken as the target frame rate, so that the transmission frame rate matches with the processing capability of the target device and the video presentation effect on the target device is ensured. In addition, the above process can be performed in a loop, and during such a loop process, the time delay of video frames can be continuously reduced, so that the display effect becomes better and better, and the user experience is greatly improved.

As another optional way, if the time delay of the first video frame is less than the preset threshold, and the time delays of a preset number of video frames following the first video frame transmitted at the reference frame rate are all less than the preset threshold, the reference frame rate is determined as the target frame rate.

If the time delay of the first video frame is less than the preset threshold, it indicates that the frame rate for transmitting the first video frame matches the processing capability of the target device. If the time delay of the preset number of video frames following the first video frame transmitted at the reference frame rate is less than the preset threshold, it indicates that the time delays all meet the requirements when the reference frame rate is used for a plurality of subsequent video frames starting from the first video frame. Therefore, it indicates that the reference frame rate can match the processing capability of the target device during this target video transmission. Therefore, the reference frame rate is used as the target frame rate for transmitting the second video frame.

When the time delay of transmitting multiple video frames using the reference frame rate meets the requirements, it can be determined that the reference frame is suitable for transmitting the target video, thus reducing the time delay of the video frame.

Further, in addition to transmitting the second video frame according to the reference frame rate as the target frame rate, the video frame following the second video frame in the target video can also be transmitted to the target device according to the reference frame rate as the target frame rate.

Through the above process, it can be determined that the reference frame rate is suitable for transmitting the target video. Therefore, it is no longer necessary to adjust the frame rate according to the time delay when the subsequent video frames in the target video are transmitted using the reference frame rate, so that the frame rate applicable to the target video can be acquired by adjusting the initial frame rates of several video frames, and a good display effect can be quickly realized.

In addition, optionally, the smart rearview mirror can save the determined target frame rate applicable to the target video this time, and set the target frame rate to be the initial frame rate for transmitting the video following the target video to the target device.

After the target frame rate is taken as the initial frame rate for transmitting the video following the target video to the target device, when the smart rearview mirror needs to stream onto the in-car console again, since the initial frame rate has been dynamically adjusted, only minor adjustment is required to match the transmission frame rate with the actual processing capacity of the target device, thus shortening the time for adjusting the frame rate.

The following describes the process of acquiring the time delay of the first video frame in the above step S202.

As an optional implementation, the smart rearview mirror can determine the time delay of transmitting the first video frame to the target device according to the creation time of the first video frame and the display time of the first video frame on the target device.

Exemplary, the smart rearview mirror can calculate the difference between the creation time and the display time of the first video frame, and take the difference as the time delay of transmitting the first video frame to the target device. Alternatively, the smart rearview mirror can also perform specific processing on the difference, such as multiplying the difference by a certain coefficient, and take the processed result as the time delay.

Determining the time delay according to the creation time and display time can not only ensure the accuracy of the time delay, but also make the calculation process simple, and greatly improve the determination efficiency.

The display time of the first video frame is provided by the target device. The creation time of the first video frame can be provided by the smart rearview mirror or by the target device. Accordingly, the display time and creation time can be acquired in the following two ways.

In the first way, after creating the first video frame, the smart rearview mirror records the identification of the first video frame and the corresponding creation time. After the first video frame is transmitted to the target device, the target device transmits the display time of the first video frame to the smart rearview mirror after it processes and displays the first video frame. Based on the identification of the first video frame, the smart rearview mirror reads the creation time of the first video frame, and determines the time delay in conjunction with the display time transmitted by the target device.

In the second way, after creating the first video frame, the smart rearview mirror temporarily stores the creation time of the first video frame, and transmits the creation time and the first video frame to the target device at the same time when the first video frame is transmitted. After receiving the information, the target device temporarily stores the creation time of the first video frame, and transmits the display time and creation time of the first video frame to the smart rearview mirror at the same time when the display time is returned to the smart rearview mirror. The smart rearview mirror can then acquire the creation time and display time of the first video frame at the same time, and determine the time delay based on the creation time and the display time.

In the second way, the smart rearview mirror transmits the creation time of the first video frame to the target device at the same time when it transmits the first video frame, and the target device transmits the creation time to the smart rearview mirror at the same time when it transmits the display time, so that the smart rearview mirror can directly acquire the creation time and display time at the same time, and there is no need to acquire the creation time in an extra way, thus greatly improving the processing efficiency.

Figure 4:
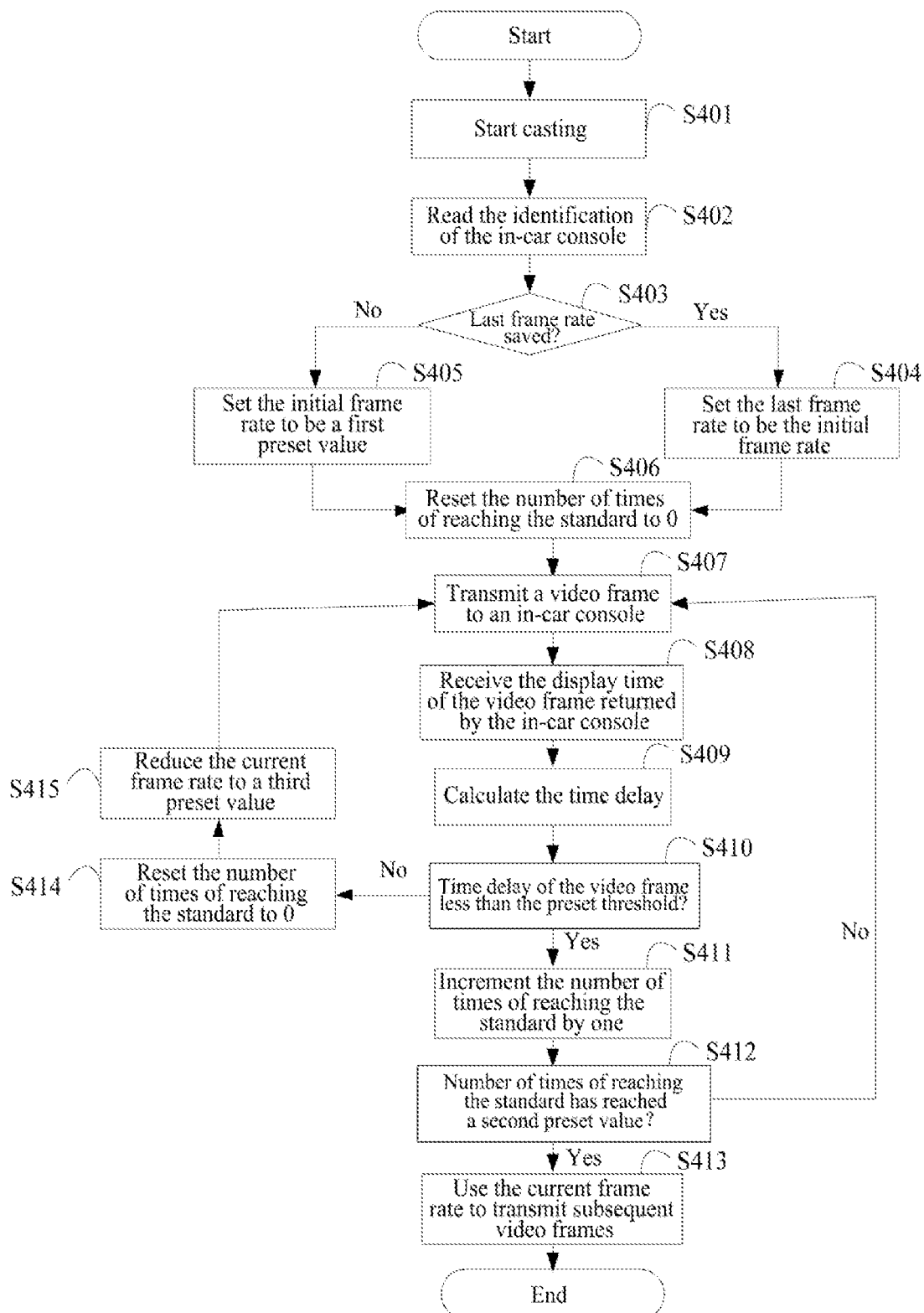
FIG. 4 is a processing flowchart of dynamically adjusting the frame rate when the smart rearview mirror is streamed onto the in-car console.

FIG. 4 is a processing flowchart of dynamically adjusting the frame rate when the smart rearview mirror is streamed onto the in-car console. As shown in FIG. 4, the process includes:

S401, start streaming.

S402, read identification of the in-car console.

S403, determine whether a frame rate used in a previous casting to the in-car console is saved. If so, go to step S404; otherwise, go to step S405.

S404, set the frame rate used in the previous casting to the in-car console to be the initial frame rate.

S405, set the initial frame rate to be the first preset value.

This first preset value can be, for example, 25 frames per second.

S406, reset the number of times of reaching the standard to 0.

S407, transmit a video frame to the in-car console.

S408, receive the display time of the video frame returned by the in-car console.

S409, calculate the time delay of the video frame according to the display time and creation time of the video frame.

S410, determine whether the time delay of the video frame is less than the preset threshold, if so, go to step S411, otherwise, go to step S414.

S411, increment the number of times of reaching the standard by one.

S412, determine whether the number of times of reaching the standard has reached the second preset value and, if so, go to step S413, otherwise, continue with step S407.

The second preset value can be, for example, 25 times.

The second preset value may be a value acquired by adding 1 to the preset number.

S413, use the current frame rate to transmit subsequent video frames.

S414, reset the number of times of reaching the standard to 0.

S415, reduce the current frame rate to the third preset value, and continue with step S407.

The third preset value can be, for example, 3 frames per second.

Figure 5:
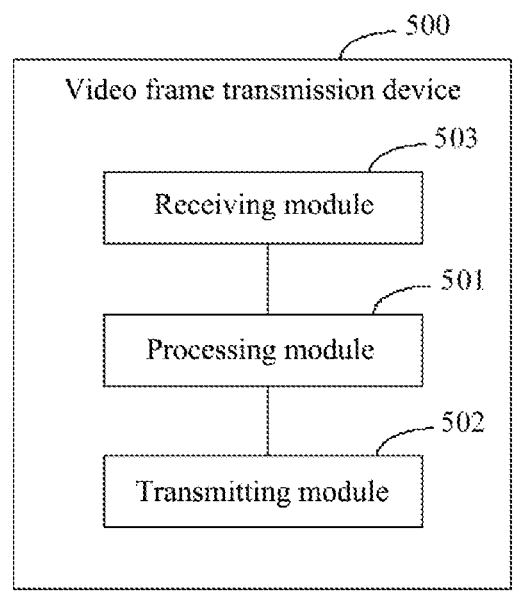
FIG. 5 is a block diagram of a video frame transmission device 500 provided by an embodiment of the present disclosure.

FIG. 5 is a block diagram of a video frame transmission device 500 provided by an embodiment of the present disclosure. As shown in FIG. 5, the device includes:

a processing module 501, configured to transmit a first video frame of a target video to a target device at a reference frame rate; acquire the time delay of the first video frame; determine the target frame rate of the second video frame to be transmitted in the target video according to the time delay.

a transmitting module 502, configured to transmit the second video frame to the target device at a target frame rate.

As an optional embodiment, the processing module 501 is specifically configured to:

when the time delay is greater than or equal to a preset threshold, reduce the reference frame rate based on the reference frame rate used when the first video frame is transmitted, so as to acquire the target frame rate.

As an optional embodiment, the processing module 501 is specifically configured to:

when the time delay is less than a preset threshold and the time delay of a preset number of video frames following the first video frame transmitted at a reference frame rate is less than a preset threshold, determine the reference frame rate to be the target frame rate.

As an optional embodiment, the transmitting module 502 is further configured to:

transmit a video frame following the second video frame in the target video to the target device at the target frame rate.

As an optional embodiment, the processing module 501 is further configured to:

set the target frame rate to be the initial frame rate at which the video following the target video is transmitted to the target device.

As an optional embodiment, the processing module 501 is specifically configured to:

determine, according to the creation time of the first video frame and the display time of the first video frame on the target device, the time delay of transmitting the first video frame to the target device.

Continue with FIG. 5, as an optional embodiment, the apparatus further includes:

a receiving module 503, configured to receive the display time of the first video frame from the target device at the target device and the creation time of the first video frame.

As an optional embodiment, the transmitting module 502 is specifically configured to:

transmit the first video frame of the target video and the creation time of the first video frame to a target device at a reference frame rate.

As an optional embodiment, the target device is an in-car console. The processing module 501 is specifically configured to:

record, according to the instruction to stream to the in-car console, the information to be displayed on the screen to acquire the target video.

As an optional embodiment, the instruction to stream to the in-car console is entered by the user.

According to an embodiment of the present disclosure, the present disclosure also provides an electronic device and a readable storage medium.

Figure 6:
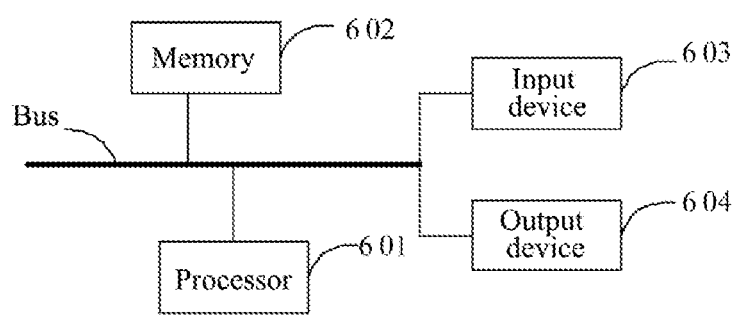
FIG. 6 is a block diagram of an electronic device according to a method of video frame transmission according to an embodiment of the present disclosure.

FIG. 6 shows a block diagram of an electronic device for the video frame transmission method according to an embodiment of the present disclosure. The electronic device is intended to represent a digital computer in various forms, such as a laptop computer, a desktop computer, a workstation, a personal digital assistant, a server, a blade server, a mainframe, and/or other appropriate computers. The electronic device may also represent a mobile device in various forms, such as a personal digital processing, a cellular phone, a smart phone, a wearable device, and/or other similar computing devices. The components, their connections and relationships, and their functions as illustrated herein are merely examples, and are not intended to limit the implementation of the disclosure described and/or required herein.

As shown in FIG. 6, the electronic device includes: one or more processors 601, a memory 602, and interfaces for connecting various components, including a high-speed interface and a low-speed interface. The various components are interconnected via different buses and can be mounted on a common motherboard or otherwise installed as required. The processors can process instructions executed within the electronic device, including instructions stored in or on the memory for displaying graphical information of the GUI on an external input/output apparatus, such as a display apparatus coupled to the interface. In other embodiments, multiple processors and/or buses can be used with multiple memories and multiple memories, if desired. Similarly, multiple electronic devices can be joined together, e.g., as a server array, a group of blade servers or a multiprocessor system, with each device providing some of the necessary operations. One processor 601 is illustrated as an example in FIG. 6.

The memory 602 is a non-transitory computer-readable storage medium provided by the present disclosure. The memory stores instructions executable by the at least one processor to enable the least one processor to implement the video frame transmission method provided in the present disclosure. The non-transitory computer-readable storage medium of the present disclosure stores computer instructions which are used to cause a computer to implement the video frame transmission method provided in the present disclosure.

The memory 602 is a non-transitory computer-readable storage medium which can be used to store non-transitory software programs, non-transitory computer executable programs and modules, such as program instructions/modules (e.g., the processing module 501, transmitting module 502 and receiving module 503 shown in FIG. 5), corresponding to the video frame transmission method in the embodiment of the present disclosure. The processor 601 runs the non-transitory software programs, instructions and modules stored in the memory 602 to execute various functional applications and data processing for the server, i.e., implementing the video frame transmission method in the foregoing method embodiments.

The memory 602 may include a program storage partition and a data storage partition, where the program storage partition may store an operating system and an application program required for at least one function, and the data storage partition may store data created for use by the electronic device for the video frame transmission method. In addition, the memory 602 may include a high-speed random access memory, and may also include a non-transitory memory, such as at least one magnetic disk storage device, a flash memory device, or other non-transitory solid-state storage device. In some embodiments, the memory 602 may optionally include a memory remotely disposed with respect to the processor 601, and the remote memory may be connected through a network to the electronic device for the video frame transmission method. Examples of the above network include, but are not limited to, the Internet, an Intranet, a local area network, a mobile communication network and combinations thereof.

The electronic device for the video frame transmission method may further include an input apparatus 603 and an output apparatus 604. The processor 601, the memory 602, the input apparatus 603, and the output apparatus 604 may be connected via a bus or other means. FIG. 6 has illustrated a connection via a bus as an example.

The input apparatus 603 can receive inputted numeric or character information, and generate a key signal input related to a user setting and function control of an electronic device for the video frame transmission method, such as a touch screen, a keypad, a mouse, a trackpad, a touchpad, a pointing stick, one or more mouse buttons, a trackball, a joystick or the like. The output apparatus 604 may include a display apparatus, an auxiliary lighting apparatus (e.g., an LED), a haptic feedback apparatus (e.g., a vibration motor) and the like. The display apparatus may include, but is not limited to, a liquid crystal display (LCD), a light emitting diode (LED) display, and a plasma display. In some embodiments, the display apparatus may be a touch screen.

Various implementations of the systems and technologies described herein may be implemented in a digital electronic circuitry, an integrated circuit system, an application-specific integrated circuit (ASIC), computer hardware, firmware, software, and/or combinations thereof. These various embodiments may include: implementations in one or more computer programs, which are executable by and/or interpreted on a programmable system including at least one programmable processor, the programmable processor may be application specific or general-purpose and can receive data and instructions from a storage system, at least one input apparatus and/or at least one output apparatus, and can transmit the data and instructions to the storage system, the at least one input apparatus, and the at least one output apparatus.

These computing programs (also known as programs, software, software applications or codes) include machine instructions of a programmable processor, and can be implemented using high-level procedures and/or object-oriented programming languages, and/or assembly/machine languages. As used herein, the terms "machine-readable medium" and "computer-readable medium" both refer to any computer program product, apparatus, and/or apparatus (e.g., a magnetic disk, an optical disk, a memory, a programmable logic device (PLD) used to provide the machine instructions and/or data to a programmable processor, including machine-readable media that receive machine instructions as machine-readable signals. The term "machine-readable signal" refers to any signal used to provide machine instructions and/or data to a programmable processor.

To provide interaction with the user, the systems and technologies described herein can be implemented on a computer that has: a display apparatus (e.g., a cathode ray tube (CRT) or liquid crystal display (LCD) monitor) for displaying information to the user; and a keyboard and a pointing apparatus (e.g., a mouse or a trackball) through which the user can provide input to the computer. Other kinds of devices may also be used to provide interaction with the user. For example, the feedback provided to the user may be any form of sensory feedback (e.g., a visual feedback, an auditory feedback, or a haptic feedback), and may be in any form (including an acoustic input, a voice input, or a haptic input) to receive input from the user.

The systems and technologies described herein can be implemented in a computing system that includes a back-end component (e.g., as a data server), or a middleware components (e.g., an application server), or a front-end component (e.g., a user computer with a graphical user interface or web browser through which the user can interact with the implementation of the systems and technologies described herein), or any combination of such back-end component, middleware component or front-end component. Various components of the system may be interconnected by digital data communication in any form or via medium (e.g., a communication network). Examples of a communication network include: a local area network (LAN), a wide area network (WAN) and the Internet.

The computer system may include a client and a server. The client and server are typically remote from each other and interact via a communication network. The client-server relationship is created by computer programs running on respective computers having a client-server relationship with each other.

It should be understood that the various forms of processes shown above can be reordered, and steps may be add or removed. For example, various steps described in this disclosure can be executed in parallel, in sequence, or in alternative orders. As long as the desired results of the technical solutions disclosed in this disclosure can be achieved, no limitation is imposed herein.

The foregoing specific implementations do not constitute any limitation on the protection scope of the present disclosure. It should be understood by those skilled in the art that various modifications, combinations, sub-combinations and substitutions may be made as needed by design requirements and other factors. Any and all modification, equivalent substitution, improvement or the like within the spirit and concept of the present disclosure shall fall within the protection scope of the present disclosure.

What is claimed is:

1. A video frame transmission method, comprising:
   transmitting a first video frame of a target video to a target device at a reference frame rate;
   acquiring a time delay of the first video frame;
   determining, according to the time delay, a target frame rate of a second video frame to be transmitted in the target video; and
   transmitting, at the target frame rate, the second video frame to the target device;
   wherein the determining, according to the time delay, a target frame rate of a second video frame to be transmitted in the target video comprises:
   if the time delay is greater than or equal to a preset threshold, reducing the reference frame rate used in transmitting the first video frame to obtain the target frame rate; or
   if the time delay is less than a preset threshold and time delays of a preset number of video frames transmitted at the reference frame rate following the first video frame are all less than the preset threshold, determining the reference frame rate to be the target frame rate.

2. The method according to claim 1, further comprising:
   transmitting, according to the target frame rate, a video frame following the second video frame in the target video to the target device.

3. The method according to claim 2, further comprising:
   setting the target frame rate to be an initial frame rate for transmitting a video following the target video to the target device.

4. The method according to claim 1, wherein the acquiring a time delay of the first video frame comprises:
   determining, according to creation time of the first video frame and display time of the first video frame on the target device, the time delay of transmitting the first video frame to the target device.

5. The method according to claim 4, wherein before the determining, according to creation time of the first video frame and display time of the first video frame on the target device, the time delay of transmitting the first video frame to the target device, the method further comprises:
   receiving, from the target device, the display time of the first video frame at the target device and the creation time of the first video frame.

6. The method according to claim 5, wherein the transmitting a first video frame of a target video to a target device at a reference frame rate comprises:
   transmitting the first video frame of the target video and the creation time of the first video frame to the target device at the reference frame rate.

7. The method according to claim 1, wherein the target device is an in-car console; and
   before transmitting the first video frame of the target video to the target device at the reference frame rate, the method further comprises:

recording, according to an instruction to stream to the in-car console, information to be displayed on a screen to acquire the target video.

8. The method according to claim 7, wherein the instruction to stream to the in-car console is entered by a user.

9. An electronic device, comprising:

at least one processor; and a memory communicatively connected to the at least one processor, wherein the memory stores thereon instructions executable by the at least one processor, and the instructions are executed by the at least one processor to enable the at least one processor to:

transmit a first video frame of a target video to a target device at a reference frame rate;

acquire a time delay of the first video frame;

determine, according to the time delay, a target frame rate of a second video frame to be transmitted in the target video; and transmit, at the target frame rate, the second video frame to the target device;

wherein the at least one processor is further enabled to:

if the time delay is greater than or equal to a preset threshold, reduce the reference frame rate used in transmitting the first video frame to obtain the target frame rate; or if the time delay is less than a preset threshold and time delays of a preset number of video frames transmitted at the reference frame rate following the first video frame are all less than the preset threshold, determine the reference frame rate to be the target frame rate.

10. The electronic device according to claim 9, wherein the at least one processor is further enabled to:

transmit, according to the target frame rate, a video frame following the second video frame in the target video to the target device.

11. The electronic device according to claim 10, wherein the at least one processor is further enabled to:

set the target frame rate to be an initial frame rate for transmitting a video following the target video to the target device.

12. The electronic device according to claim 9, wherein the at least one processor is further enabled to:

determine, according to creation time of the first video frame and display time of the first video frame on the target device, the time delay of transmitting the first video frame to the target device.

13. The electronic device according to claim 12, wherein the at least one processor is further enabled to:

receive, from the target device, the display time of the first video frame at the target device and the creation time of the first video frame.

14. The electronic device according to claim 13, wherein the at least one processor is further enabled to:

transmit the first video frame of the target video and the creation time of the first video frame to the target device at the reference frame rate.

15. The electronic device according to claim 9, wherein the target device is an in-car console; and the at least one processor is further enabled to:

record, according to an instruction to stream to the in-car console, information to be displayed on a screen to acquire the target video.

16. A non-transitory computer-readable storage medium storing thereon computer instructions that are used to cause a computer to execute the method according to claim 1.

* * * * *